(12) United States Patent
Fukuchi

(10) Patent No.: US 6,385,418 B1
(45) Date of Patent: May 7, 2002

(54) ROTATIONAL DRIVING APPARATUS FOR USE IN AN IMAGE-FORMING DEVICE

(75) Inventor: Yutaka Fukuchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/698,056

(22) Filed: Oct. 30, 2000

(30) Foreign Application Priority Data

Oct. 29, 1999 (JP) .......................................... 11-309013

(51) Int. Cl.$^7$ ............................................. G03G 15/00
(52) U.S. Cl. ...................................................... 399/167
(58) Field of Search ................................. 399/167, 117

(56) References Cited

U.S. PATENT DOCUMENTS

| | | | | |
|---|---|---|---|---|
| 4,839,690 A | * | 6/1989 | Onoda et al. ................ | 399/117 |
| 4,922,297 A | * | 5/1990 | Kondo ......................... | 399/117 |
| 5,124,759 A | | 6/1992 | Fukuchi et al. | |
| 5,339,145 A | * | 8/1994 | Omura ........................ | 399/318 |
| 5,689,764 A | | 11/1997 | Fukuchi et al. | |

FOREIGN PATENT DOCUMENTS

JP 11109836 4/1999

* cited by examiner

*Primary Examiner*—Quana M. Grainger
(74) *Attorney, Agent, or Firm*—Oblon, Spivak, McClelland, Maier & Neustadt, P.C.

(57) ABSTRACT

A rotating apparatus for rotating, by transferring a driving force generated by a motor disposed in a body to a rotation member detachable from the body. A driving shaft disposed in the body transfers the driving force by rotating itself in a prescribed direction. A driving force receiving device has a receiving joint and is in the rotation member to receive the driving force. A transferring device engages the driving shaft and transfers the driving force to the rotation member. The transferring device includes transferring joint for engaging with the receiving joint. A moving member moves the transferring device back and forth along the driving shaft so as to engage and disengage the transmitting joint respectively with the receiving joint when the receiving device contacts the transferring device. A guiding member is provided at least one of the driving shaft and the transferring device. A camshaft is provided on the driving shaft and the transferring device and fits into the guiding member. The camshaft comes in close proximity with contacts one end of the guiding member when the receiving joint and transferring joint engage. The cam shaft comes in close proximity with another end of the guiding member when transferring joint separates receiving joint at its initial position. In addition, the camshaft in relation to the guiding member is tightly fitted near one end thereof and loosely fitted near the other end thereof.

22 Claims, 11 Drawing Sheets

Front Side of Body ← → Rear Side of Body

Front Side of Body ←——→ Rear Side of Body

Front Side of Body ⟵⟶ Rear Side of Body

Front Side of Body ←――――→ Rear Side of Body

FIG. 8A
*BACKGROUND ART*
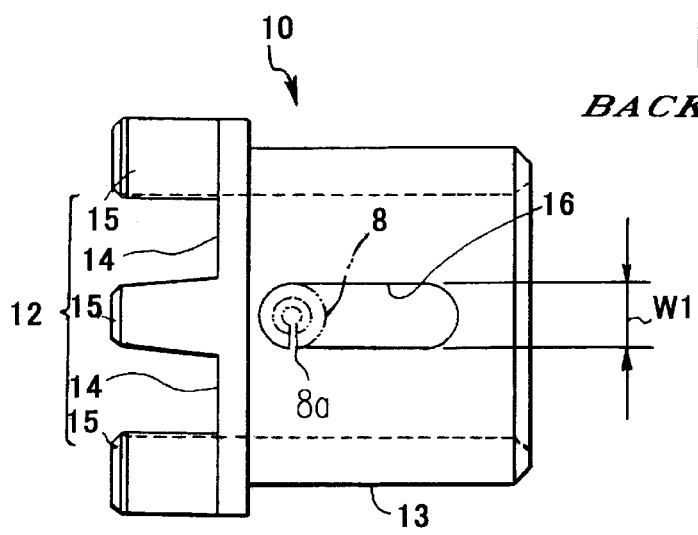
Front Side of Body ←——————→ Rear Side of Body
FIG. 8B
*BACKGROUND ART*
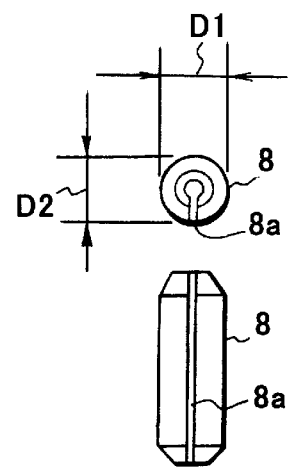
FIG. 8C
*BACKGROUND ART*

Front Side of Body ←——→ Rear Side of Body

Front Side of Body ←——→ Rear Side of Body

ROTATIONAL DRIVING APPARATUS FOR USE IN AN IMAGE-FORMING DEVICE

CROSS REFERRENCE TO RELATED APPLICATIONS

This application claims priority under 35 USC §119 to Japanese Patent Application No. 11-309013 filed on Oct. 29, 1999, the entire contents of which are incorporated herein by reference.

BACKGROUND OF THE INVENTION

1. Field of the Invention

The present invention generally relates to an image forming apparatus, such as a copier, a printer, a facsimile, a duplicator, and a combined machine combining these image-forming apparatuses, and in particular relates to a rotation member driving apparatus for use in the image forming apparatus.

2. Discussion of the Background Art

It is well known, in an image-forming apparatus having a drum shaped photo-conductive member (hereinafter referred to as a PC drum), that the PC drum and its peripheral units are made into a single unit detachable in relation to an essential structure of the image forming apparatus (hereinafter simply referred to as a body). Such a detaching operation is generally performed as a countermeasure against fatigue made by time elapsing of the PC drum each time when, e.g., a unit of 100 thousand of image formations has been made to replace with a new PC drum unit. To improve performance of the detaching operation, the following background rotating member-driving apparatus illustrated in FIGS. 7 through 11 is generally utilized.

As illustrated in FIG. 9, the PC drum 1 is configured to be cylindrical. The right side of the PC drum 1 should be a rear side of the body, and the left side thereof should be a front side of the body. A flange 2 is integrally provided to support an end of the PC drum 1. A driving shaft guiding hole 3 is provided to penetrate the flange 2. A guiding hole 4 having a diameter larger than the driving shaft-guiding hole 3 is provided in the vicinity and at the right side of the driving shaft-guiding hole 3.

A separation wall is provided as a border between the driving shaft guiding hole 3 and the guiding hole 4. Four convex portions 5 and four concave portions 6 are each respectively disposed on a cross at the guiding hole 4 side of the separation wall. The four convex portions 5 and the four concave portions 6 collectively constitute a driving force receiving joint 11 as claimed.

A PC drum unit (not shown) pivotally supports the PC drum 1 at the end of the front side of the PC drum 1. The PC drum unit is detachably attached to the body from the front side to the rear side (not shown) of the body. When the PC drum unit is attached to the body, a rotational motive power of the driving shaft 7 can be transmitted to the flange 2, then to the PC drum 1.

As illustrated in FIG. 7, a penetrating hole 9 is formed in the driving shaft 7 at the vicinity of the front side end of the driving shaft 7, and penetrates in a direction of the diameter of the driving shaft 7. As illustrated in FIGS. 8A and 7, a driving force transferring member 10 is attached to the driving shaft 7 as described earlier. The driving force transferring member 10 is formed almost in a cylindrical shape and is slides to fit with the driving shaft 7.

Continuing with FIG. 8A, a driving side joint 12 is formed at the front side end of the driving force transferring member 10. Four convex portions 15 and four concave portions 14 are formed on the driving side joint 12 on a circumference concentric with the driving force transferring member 10 and disposed respectively on a cross. Thus, these four convex portions 14 and the four concave portions 15 can mesh with the corresponding convex portions 5 and concave portions 6, of FIG. 9.

Back to FIG. 7, an oblong hole 16 is formed on another side of the driving force transferring member 10 in the vicinity of the driving side joint 12. Thus, when assembling the driving force transferring member 10 to the driving shaft 7, the driving force transferring member 10, and, the driving side joint 12 are fitted with the driving shaft 7. The driving force transferring member 10 is directed to the rear side of the body. The oblong hole 16 is then positioned above the penetrating hole 9. A spring pin 8 is inserted into both the oblong hole 16 and the penetrating hole 9 with pressure.

In FIGS. 8A, 8B, and 8C, the shorter diameter of the oblong hole 16 is represented by W1. A diameter of the spring pin 8 is represented by D1. The diameter D1 should be measured in a diameter changeable direction by including a split portion 8a in the condition that a force is not applied to the spring pin 8. A diameter perpendicular to the diameter D1 is represented by D2. In this example, each diameter is predetermined as follows.

D2=1.95 mm

D1=2.15 mm

W1=2.1 through 2.2 mm

When the spring pin 8 is to be inserted into the penetrating hole 9 through the oblong hole 16, the spring pin 8 is inserted with the slot portion being engaged with the oblong hole 16. Thus, impediment to be produced when the insertion is made can be relatively reduced.

Thus, the driving force transferring member 10 can slide while being guided by the spring pin 8 during a stroke of the oblong hole 16. In addition, the driving force transferring member 10 can move under the condition where the spring pin 8 fitting into the oblong hole deforms as little as possible in the direction in parallel to the shorter diameter W1. The oblong hole 16 has both ends each having a curvature fitting with an outer surface of the spring pin 8 to improve contacting efficiency of the spring pin 8 when the spring pin 8 contacts the end. A protruding portion of the spring pin 8 protruding from the driving shaft 7 is designed with nearly the same thickness of the cylinder of the driving force transferring member 10.

Referring to FIG. 7, when the driving force transferring member 10 is assembled to the driving shaft 7, a coil spring 17 is set around both of the driving shaft 7 and the driving force transferring member from the rear side of the driving shaft 7, and, accordingly, the driving force transferring member. An E-shaped ring 18 is attached to a groove 19 formed around the driving shaft 7 while the front end of the coil spring 17 contacts the joint 15 and the rear side of the coil spring pin 17 is positioned at the front side than the groove 18.

Thus, the E-shaped ring 18 can stop the rear side of the coil spring 17, and, as a result, the coil spring 17 engages the driving force transferring member 12. Thus, the driving force transferring member 12 is always biased to the front side of the body.

When no force is applied to the driving force transferring member 12, one end of the oblong hole 16, i.e., the end of the rear side of the oblong hole 16, contacts the spring pin 8 with some bias made by the coil spring 17 as illustrated in FIG. 9. Conversely, if any force directing to the rear side of the body is applied to the driving force transferring member 10, the spring pin 8 changes its position to the other end of the oblong hole 16, i.e., the front side of the body, or in the vicinity thereof as illustrated in FIG. 2.

Thus, movement of the driving force transferring member 10 ranges from a position where one end (not shown) of the oblong hole 16 contacts the spring pin 8 to a position where the other end of the oblong hole 16 contacts the spring pin 8.

In FIG. 9, the driving shaft 7 is supported by the apparatus body (not shown) at its rear side end so as not to be displaced either toward the front side or the rear side of the body. The driving shaft 7 is engaged with a driving motor via gears of driving force transmitting power as mentioned later.

Still referring to FIG. 9, when the PC drum 1 is to be attached to the driving shaft 7, an operator firstly lifts the PC drum 1 together with the PC drum unit (not shown). The operator inserts the same toward the rear side of the body in a manner that an axis of the driving shaft-guiding hole 3 substantially accords with that of the driving shaft 7. The operator further pushes the PC drum unit in a direction as shown by an arrow 20 until the PC drum unit reaches a stopper (not shown) while a tapered portion 7a formed at a leading end of the driving shaft 7 engages with the guiding hole 4.

Further, the tapered portion 7a is lead toward the driving shaft guiding hole 3 via the guiding hole 4, and a position of the PC drum unit is fixed at a predefined position. A securing member (not shown) then secures the PC drum unit. At that time, the convex portions 15 and the concave portions 14 are inserted and each respectively engages with the corresponding concave portions 5 and the convex portions 6 with the bias of the coil spring 17. Thus, a rotational force of the driving shaft 7 can be transmitted to the PC drum 1 via the engagement.

To make the engagement smooth, a width of each convex portion 15 is designed to be smaller than that of each concave portion 6, and width of each concave portion 6 is also designed to be larger than that of each convex portion 15. In addition, to facilitate a meshing operation, a tapered portion 115 is formed at a leading end of each convex portion in such a manner that the closer to its leading edge the smaller in diameter, and a tapered portion is also formed at a bottom of each concave portion in such a manner that deeper the narrower.

If the operator simply attaches the PC drum 1 together with the PC unit to the apparatus body, both the concave portions 14 and the convex portions 15 do not precisely accord with the corresponding convex portions 5 and the concave portions 6, respectively, at the beginning of the meshing operation. For example, as illustrated in FIG. 10, an entrance of each convex portion 14 collides with a leading end of each convex portion 5, and the meshing is impossible.

To prevent such a problem, the driving shaft 7 executes idling rotation when the driving side joint 12 is separated from the driving force receiving side joint 11. In addition, the driving force transferring member 10 is moved toward the front side of the body by elastic pressure made by the coil spring 17 at first when both of the concave portions 14 and the convex portions 15 are aligned with the corresponding convex portions 5 and the concave portions 6, respectively. As a result, the concave portions 14 and the convex portions 15 can automatically be aligned with the convex portions 5 and the concave portions 6, respectively, as illustrated in FIG. 11.

Thus, to automatically execute the meshing operation, the driving force transferring member 10 is designed to move in the direction in parallel to the driving shaft 7 within the longitudinal range of the oblong hole 16 as mentioned above. Namely, the driving force transferring member 10 is moved toward the rear side of the body by the driving force receiving side joint 11 to deviate from a normal meshing position, when a portion of one of the convex portions 15 contacts a portion of one of the convex portion 5 at a position. When the concave portions 14 and the convex portions 15 are aligned with the convex portions 5 and the concave portions 6, respectively, the driving force transferring member 10 is moved to the front side of the body by the bias of the coil spring 17.

The flange 2 where the driving force receiving side joint 11 is located, the driving force transferring member 10 where the driving side joint 12 is located, the spring pin 8, the oblong hole 16, the coil spring 17, and the E-shaped ring 18 and related structure collectively constitutes the rotation member driving apparatus as claimed.

When the concave portions 14 and the convex portions 15 mesh with the convex portions 5 and the concave portions 6, respectively, the spring pin 8 positions at the front side end of the oblong hole 16 as illustrated in FIG. 11. In this state, a gap between the shorter diameter W1 of the oblong hole 16 and the spring pin 8 is designed as small as possible, as shown in FIG. 8A. That is, if the gap is large enough, the gap generally introduces vibration of the PC drum 1, and resulting in generating jitter on an image formed on the PC drum 1.

To avoid the above-noted problem, a curved portion of one end, i.e., the end of the front side of the oblong hole 16 of the background art is designed to contact the spring pin 23 so that the amount of gap therebetween is substantially zero. Since a backlash occurs between the driving force transferring member 10 and the driving shaft 7 due to the gap, the difference between the shorter diameter W1 of the oblong hole 16 and a diameter of the spring pin 8 is designed as small as possible. In addition, the rear side end of the oblong hole 16 is also made with a prescribed curvature to improve the contacting efficiency of the spring pin 8.

However, if the contacting efficiency is highly improved, and when the idling rotation is performed, and, accordingly, the driving force transferring member 10 is going to be moved toward the front side of the body with the bias of the coil spring 17, the driving force transferring member 10 sometimes can not move because the friction of the spring pin 8 in relation to the oblong hole 16 is too high to be able to slide. As a result, the above-mentioned meshing condition can not correctly be established, and the PC drum 1 is not driven. Thereby, the image formation is impossible.

The above-mentioned example assumes that the structure in which the PC drum is held is in the PC drum unit. However, the same problem occurs when a PC drum is solely detached to the apparatus body.

SUMMARY OF THE INVENTION

The present invention has been made in view of such problems and to address and resolve such problems. Accordingly, it is an object of the present invention to provide a novel rotating apparatus for rotating, by transferring a driving force generated by a motor disposed in a body, a rotation member detachable from the body. A driving shaft disposed in the body may transfer the driving force by rotating itself in a prescribed direction. A driving force receiving device may be disposed in the rotation member and has a driving force receiving joint configured to receive the driving force. A driving force transferring device may be engaged with the driving shaft and includes a driving force transferring joint configured to engage with the driving force receiving joint.

The driving force transferring device may transfer the driving force from the driving shaft to the rotation member. A moving member may move the driving force transferring device back and forth along the driving shaft so as to engage and disengage the driving force transmitting joint respectively with the driving force receiving joint when the driving force receiving device contacts the driving force transferring device. A guiding member may be provided at least one of the driving shaft and the driving force transferring device. A camshaft may be provided on at least another one of the driving shaft and the driving force transferring device, and may fit into the guiding member. The camshaft may nearly contact one end of the guiding member when the driving force receiving joint engage with the driving force transferring joint. The cam shaft may nearly contact another end of the guiding member when the driving force transferring joint is separated from the driving force receiving joint and positioned at it initial position. A fitting level of the camshaft in relation to the guiding member is strict at around the one end, and is loose at around the other end.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8A is a front side view of the driving force-transferring member illustrated in FIG. 7;

FIG. 8B is a plan view of a spring pin engaged with the driving force transferring member illustrated in FIG. 8A;

FIG. 8C is a front view of the spring pin illustrated in FIG. 8B;

DESCRIPTION OF THE PREFERRED EMBODIMENTS

Figure 4:
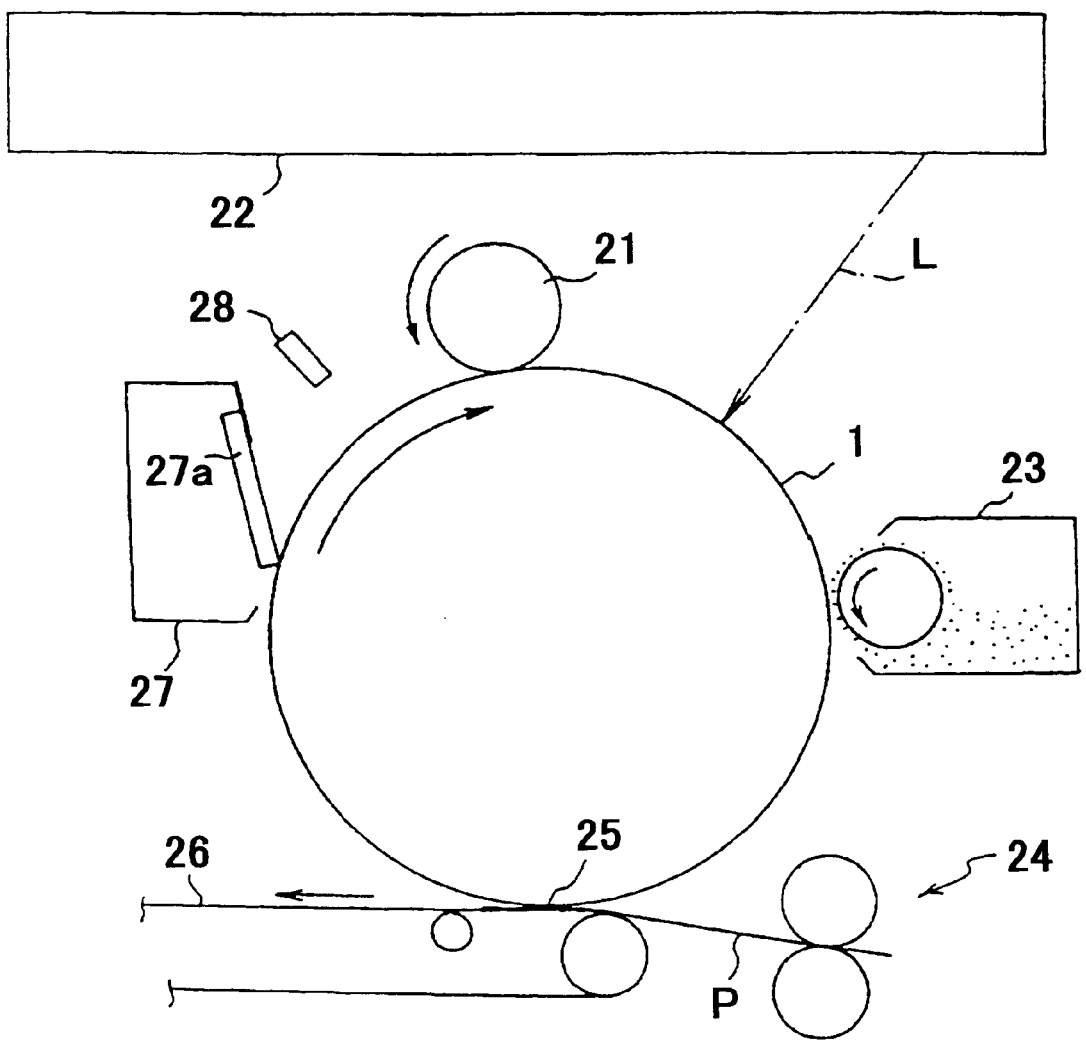
FIG. 4 is a chart illustrating one example on an image forming apparatus to which the present invention is applied.

Referring now to the drawings, wherein like reference numerals and letters designate identical or corresponding parts throughout several views, a structure and a schematic operation of one example of an image forming apparatus which employs a rotation member driving apparatus according to the present invention is now described referring to FIG. 4.

A plurality of rotational members are generally employed in an image forming apparatus beside a PC drum 1 having a drum shape as one example of an image carrier. The present invention is applicable to each of these rotation members. In the following example, the rotational member should be the PC drum 1, and a driving force-transmitting device for driving the PC drum 1 should be a driving apparatus for the rotational member.

A PC drum unit (not shown) may be employed so as to support the PC drum 1. A frame of an apparatus body may support the PC drum unit. A driving shaft for transferring a driving force may be employed so as to be connected to the PC drum 1. The PC drum 1 receives a rotational force from the driving shaft and is rotationally driven in a prescribed direction.

A surface of the PC drum 1 may be evenly charged with a prescribed polarity by a charging roller 21 rotating by contacting the surface. To the charged surface, an optically modulated laser beam L may be irradiated from an optical writing apparatus 22, and thereby a prescribed latent image is formed on the surface. The latent image is visualized with toner while passing through a developing apparatus.

A recording sheet P may be fed from a sheet feeding apparatus (not shown). The recording sheet P may temporarily be stopped advancing somewhere by a pair of register rollers 24, and then fed to a transferring station 25 by a prescribed timing. A toner image on the PC drum 1 may be transferred onto the recording sheet P at the transferring station 25.

The recording sheet P having the transferred toner image may be further fed to a fixing station (not shown) by a transferring belt 26. The toner image may be fixed on the recording sheet P while the recording sheet P passes through the fixing station. The recording sheet P having the fixed toner image may be ejected and is stacked on an ejection tray (not shown).

Some toner remaining on the surface of the PC drum 1 after the toner transferring process may be removed by a cleaning apparatus 27 having a cleaning blade 27a contacting the surface of the PC drum 1, thereby the surface of the PC drum 1 may be cleaned. The surface of the PC drum 1 may be discharged by a light irradiated from a discharge lamp 28 after the cleaning process, thereby next image formation is on standby.

Figure 5:
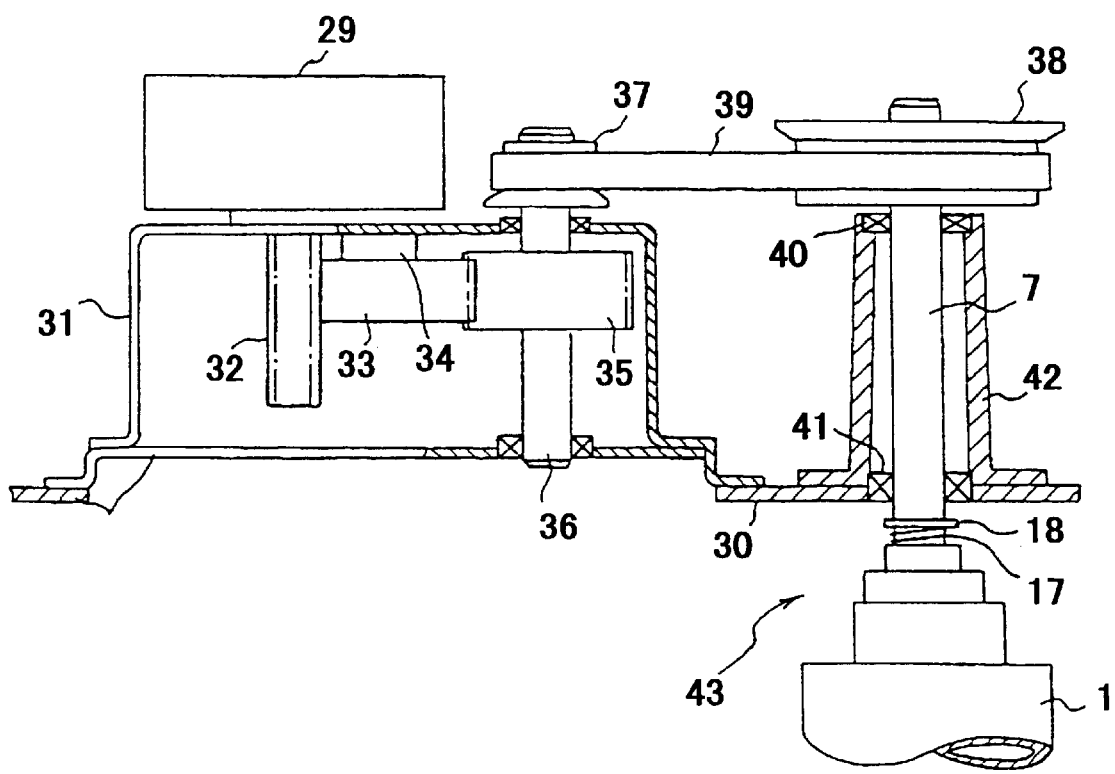
FIG. 5 is a chart illustrating a mechanical construction of a photo-conductive member-driving unit according to the present invention.
Figure 6:
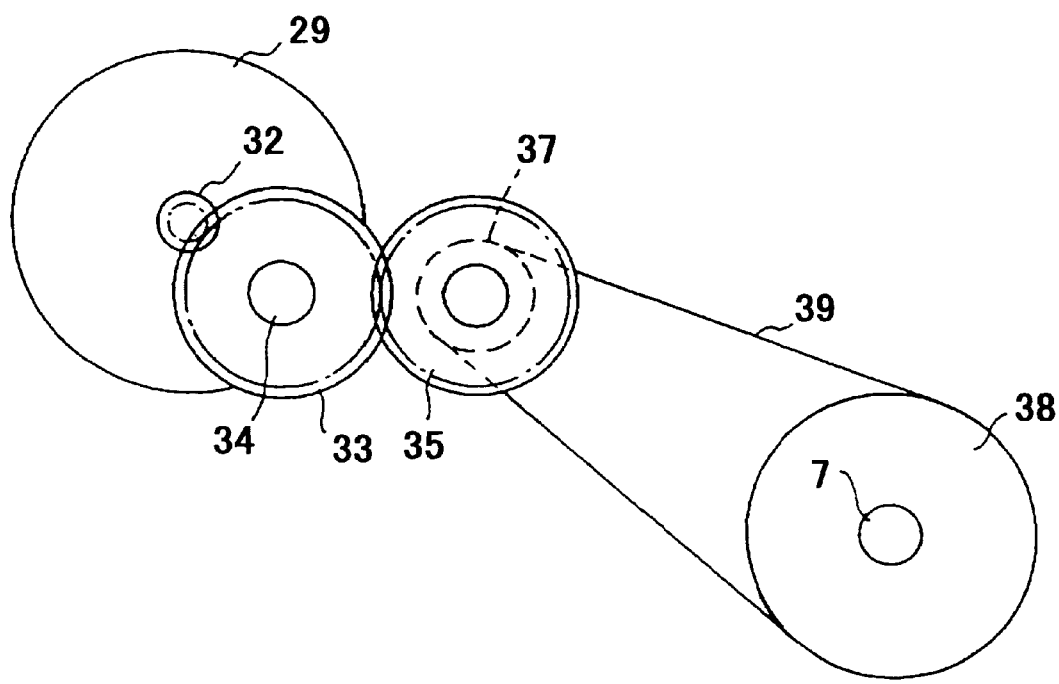
FIG. 6 is a chart illustrating a transmission for transferring a motive power transmitting route of the photo-conductive member-driving unit illustrated in FIG. 5.
Figure 7:
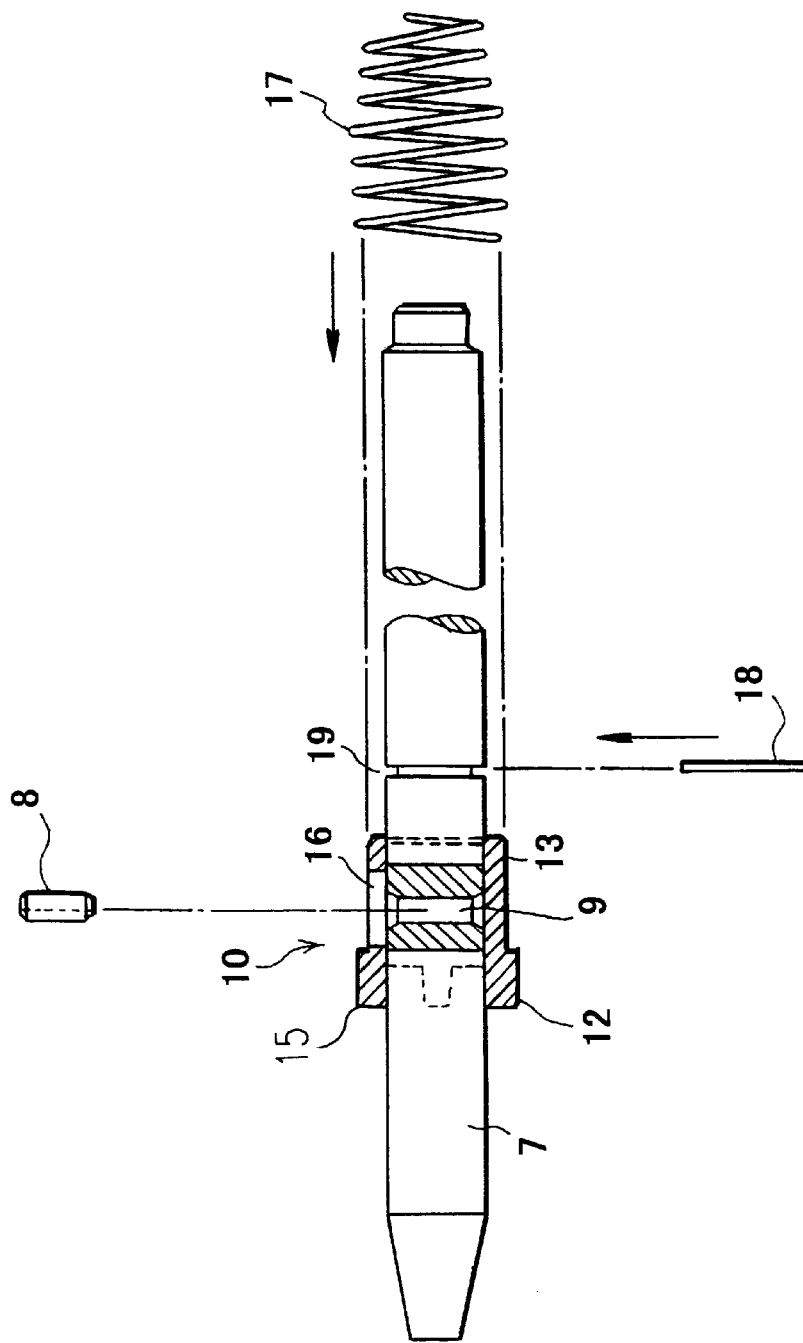
FIG. 7 is an exploded diagram of the background driving force transferring member, its related member, and a driving shaft.

A route for transmitting a rotational force, which starts from a driving motor 29 to the PC drum 1 is now described referring to FIGS. 5 and 6. As illustrated in FIG. 5, a bracket 31 secured to the frame 30 of the body may firmly support the driving motor 29.

A first decelerating gear 33 made of plastic may mesh with an output gear 32 integral with an output shaft of the driving motor 29. The first decelerating gear 33 may freely be rotationally supported by a shaft 34 secured to the bracket 31 and mesh with a second gear also made of plastic. A shaft 36 may be supported by the bracket 31 and mounts the second gear 35 thereon.

A timing pulley 37 may be secured to one end of the shaft 36 concentric with the second gear 35. The timing pulley 37 and a timing pulley 38 may cooperatively wind an endless timing belt 39 therearound. The timing pulley 38 may be secured to one end of a driving shaft 7 rotatably supporting the PC drum 1 at another end.

A PC drum holder 42 may be secured to the frame 30 and rotatably support the driving shaft 7 via bearings 40 and 41. The PC drum unit may support another end (not shown) of the driving shaft 7 when the PC drum unit is attached to the apparatus body. Otherwise, the apparatus body may directly support the PC drum 1. The driving shaft 7 may be connected to the PC drum 1 via the rotation member driving apparatus 43.

In FIGS. 5 and 6, when the driving motor 29 operates, and, accordingly, the output gear rotates, the rotation force may be carried to the timing pulley 37 via the first gear 33, the second gear 35, and the shaft 36. The rotation force may further be carried to the PC drum 1 via the timing belt 39, the timing pulley 38, the driving shaft 7, and the rotation member driving apparatus 43. Thereby, the PC drum 1 may rotate clockwise in FIG. 4.

The structure of the rotation member driving apparatus 43 illustrated in FIG. 5 will now described. The rotation member driving apparatus 43 may be composed of the following devices similar to the devices of the background art described earlier referring to FIGS. 7 through 11.

Figure 9:
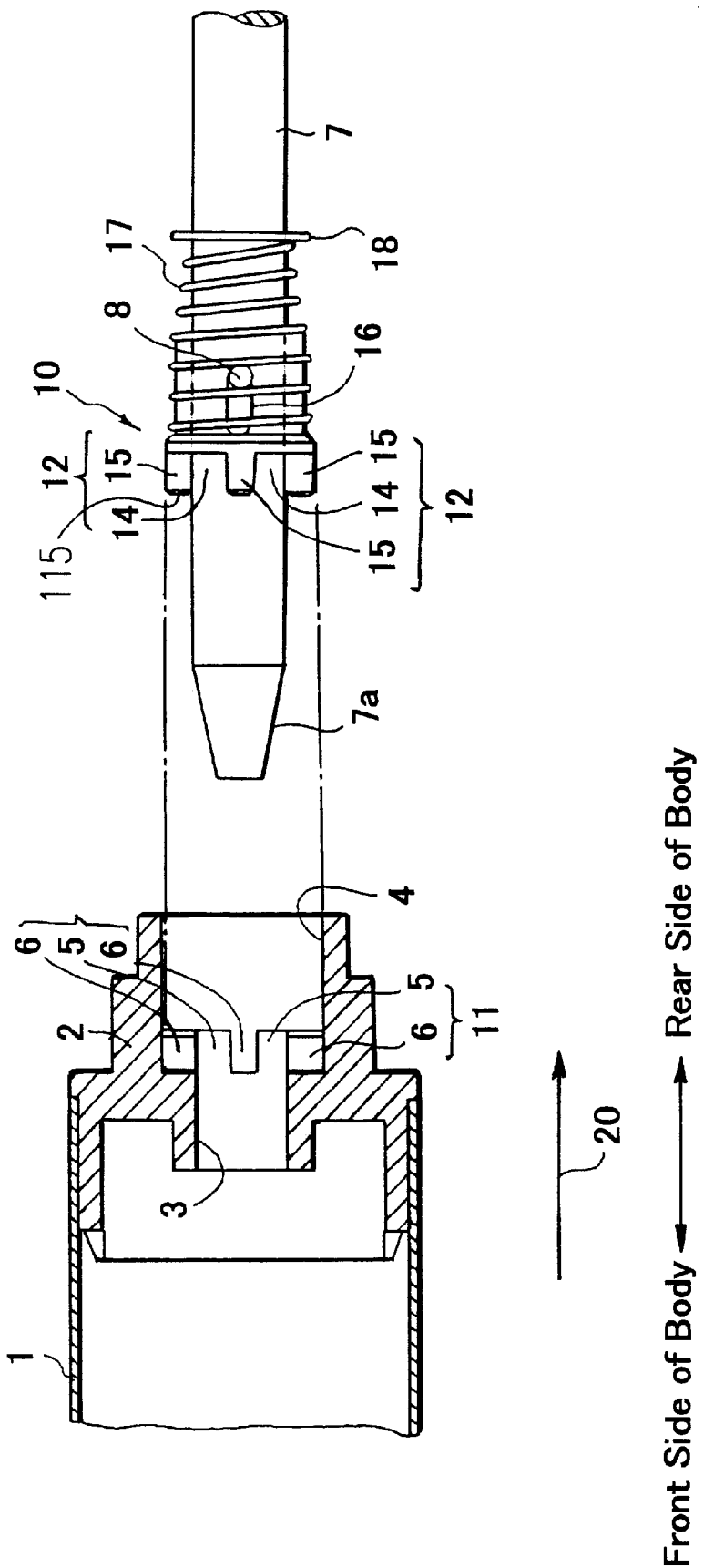
FIG. 9 is an exploded diagram illustrating a positional relation between the photo-conductive member, i.e., the rotation member, and the driving shaft.
Figure 10:
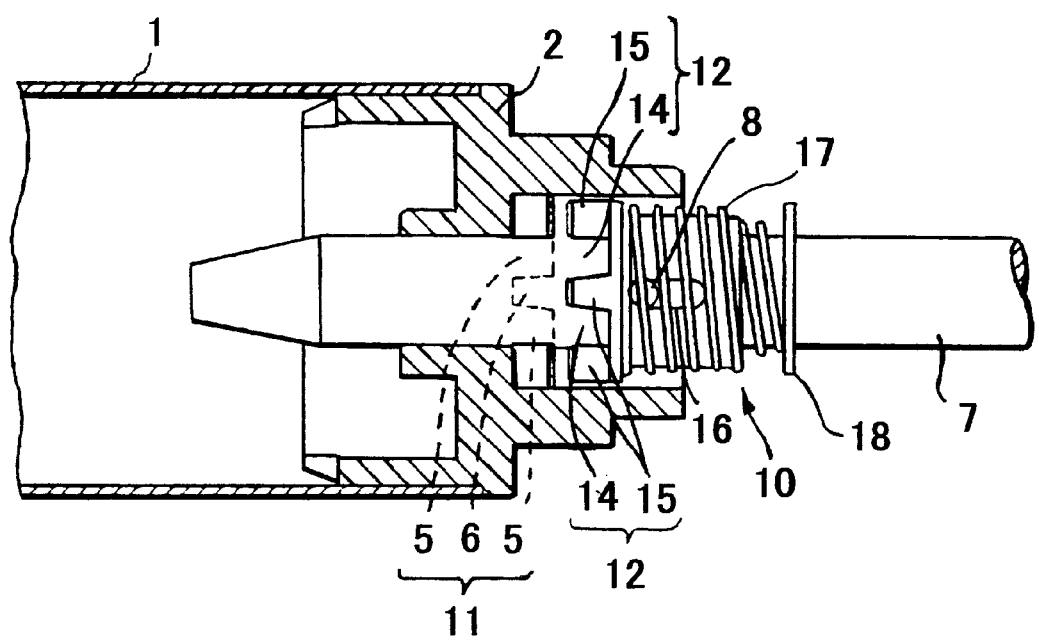
FIG. 10 is a schematic sectional view of the background rotation member driving apparatus, which illustrates a condition where a driving side joint is separated from a driving force receiving side joint.
Figure 11:
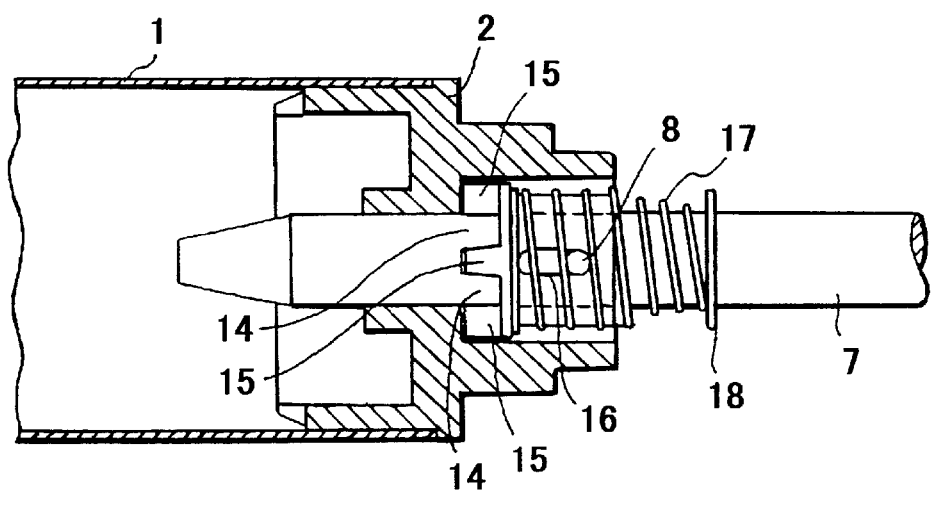
FIG. 11 is a schematic sectional view of the background rotation member driving apparatus, which illustrates a condition where the driving side joint contacts the driving force receiving side joint.

Now turning to FIG. 9, the flange 2 constituting the driving force receiving side joint 11, the driving force transferring member 10 constituting driving side joint 12, and the spring pin 8 may be employed. Further, the coil spring 17, the E-shaped ring 18, and the oblong hole 16 or the like may be employed. In this respect, similar devices are hereinafter not described in detail to avoid repetition.

Figure 1A:
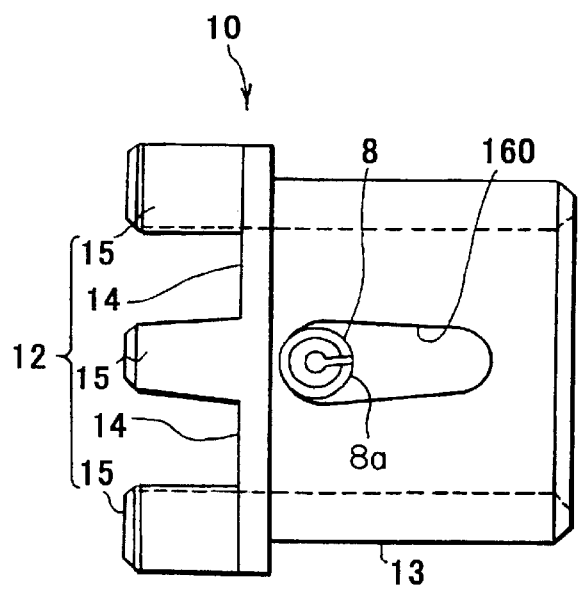
FIG. 1A is a front side view of a driving force transferring member according to the present invention.
Figure 1B:
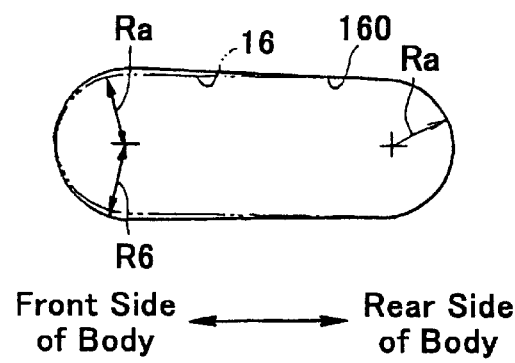
FIG. 1B is a chart illustrating an oblong hole formed on the driving force transferring member illustrated in FIG. 1A.

FIG. 1A illustrates a front side view of the driving force transferring member 10 of the present invention. FIG. 1B illustrates the enlarged oblong hole 160 formed on the driving force transferring member 10. The Background Art oblong hole 16 is illustrated in FIG. 1B by a dotted line for comparison with the oblong hole 160. A shaft composed of a spring pin 8 may fit into the oblong hole 160 so as to contact and slide along the entire range of the oblong hole 160 formed in a longitudinal direction.

In this example, a fitting level of the spring pin 8 in relation to the oblong hole 160 at the rear side end of the oblong hole 160 is tapered or narrows as far as the sliding contact of the pin 8 is possible. Conversely, the fitting level of the spring pin 8 at the front side of the oblong hole 160 can be wider. The spring pin 8 may have a substantially cylindrical shape. The oblong hole 160 may have at both ends semicircular portions, respectively to fit with the spring pin 8.

The background art oblong hole 16 may be obtained by performing the following process. First, a pair of circles, each of which has a radius of Ra, may be drawn on a plate or the like (not shown) at a prescribed target position, because a radius of the curvature of the rear side should be the same as that of the curvature of the front side. After that, a pair of tangent lines are drawn to connect both the circles. Then, inner portion of the plate to both tangent lines and circles, may be punched out.

However, the radius of the curvature of the rear side is designed the same as that of the spring pin 8, e.g., Ra, as far as sliding contact of the spring pin 8 is possible. However, the radius of the curvature of the front side may be larger, e.g., Rb. Thus, the oblong hole 160 may be designed to look like an egg.

Figure 2:
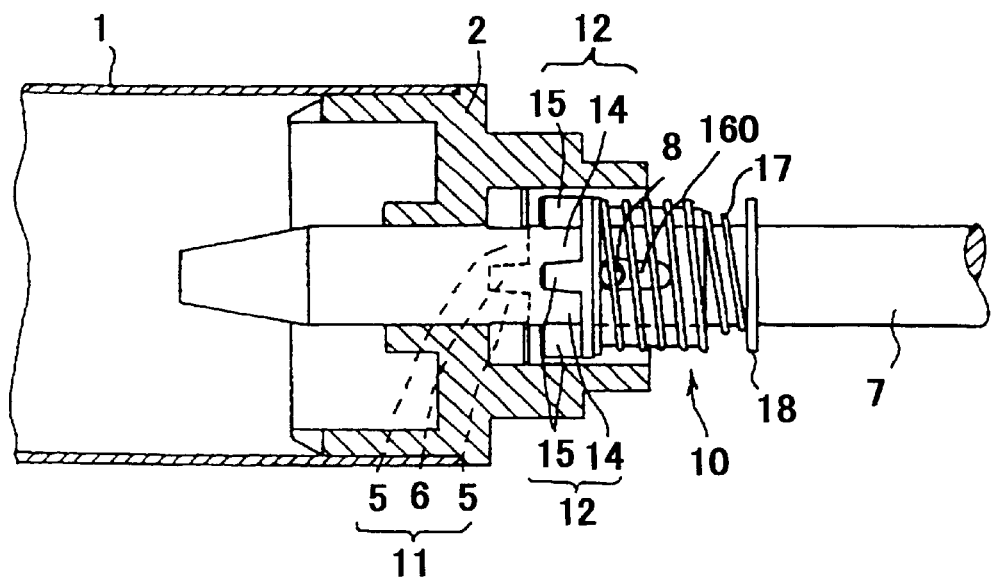
FIG. 2 is a schematic partially sectional view of a rotation member driving apparatus when a driving side joint is separated from a driving force receiving side joint according to the present invention.

Thus, when using this oblong hole 160, a fitting level of the spring pin 8 in the oblong hole 160 becomes loose at the front side end. To the contrary, a fitting level of the spring pin 8 becomes tight at the rear side end of the oblong hole 160. Further, as depicted in FIG. 2, some bias may be applied to the driving force transferring member 10 by the coil spring 17 in a direction in which the driving side joint 12 approaches to the driving force receiving side joint 11.

A meshing operation executed when the PC drum unit is exchanged with a new one according to the present invention is now described. When the PC drum unit is attached to the apparatus body, one of the convex portions 5 contacts one of the convex portions 15. Both the driving force receiving side and the driving side joints 11 and 12 are temporarily separated from each other. However, owing to the bias of the coil spring 17, when the driving shaft 7 is rotated as an idling operation, and each convex portion 5 is displaced from each convex portion 15 and comes to accord with each concave portion 6, the spring pin 8 may be smoothly moved by the pressure of the coil spring 17 along the oblong hole 160 toward the front side end (i.e., the end of larger diameter side). Simultaneously, the driving side joint 12 may precisely contact the driving force receiving joint 11. Since the spring pin 8 loosely fits into the oblong hole at around the front side end, the movement is not awkwardly started as different from when the background art oblong hole 16 is used. Further, the PC drum 1 may reliably rotate with a driving force.

Since the driving force transferring member 10 is made of sintering material and the oblong hole 160 is formed by punching the sintering material during a stamping operation, the inner circumferential surface of the oblong hole 160 is generally rough due to clawing upon return. Thus, if the spring pin 8 contacts with such a return in a face to face manner, it is substantially impossible for the spring pin 8 to smoothly slide and move due to the so-called clawing.

However, according to this embodiment, since the curvature of the front side end of the oblong hole 160 has a radius of Ra, and that of the rear side end thereof has a radius of Rb larger than Ra, and, the spring pin 8 and the oblong hole 160 do not contact each other in a face to face manner, a malfunction from high contacting efficiency of the spring pin 8 does not appear.

Accordingly, a proper meshing condition of both convex portions and the concave portions is obtained.

Thus, it is especially preferable to loosen the fitting level of the spring pin 8 in relation to the oblong hole 160 at the front side end of the oblong hole 160 because the oblong hole obtained by punching out the sintering material tends to have a return as mentioned earlier.

Figure 3:
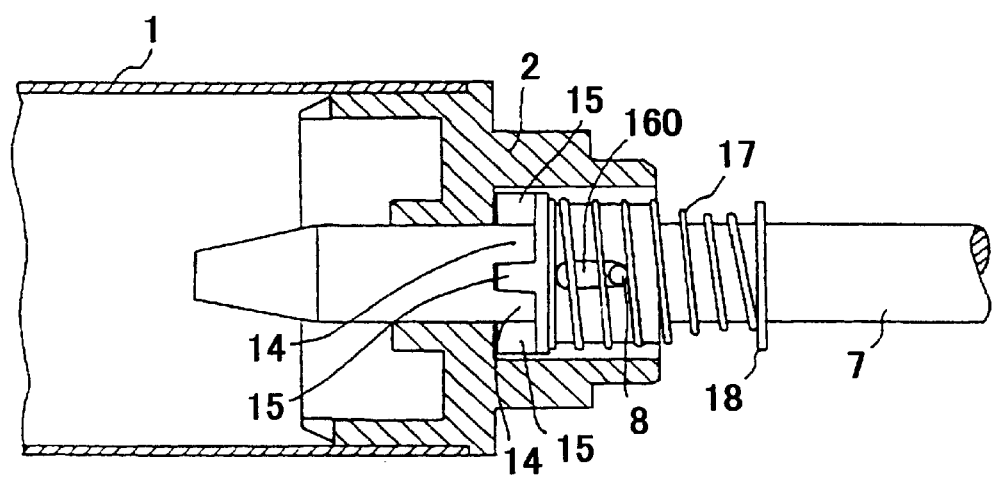
FIG. 3 is a schematic partially sectional view of a rotation member driving apparatus when the driving side joint contacts the driving force receiving side joint.

Further, as illustrated in FIG. 3, when both the driving side joint 12 and the driving force receiving side joint 11 normally contact each other, the convex portions and the concave portions normally mesh with each other, the spring pin 8 may contact the rear side end of the oblong hole 160. Since a gap may substantially not exist between the spring pin 8 and the oblong hole 160 at the rear side end, and the fitting condition is tight there, vibrations of the PC drum 1 may be almost completely suppressed, and accordingly, an imperfection rarely appears on an image. Especially, in a copier where the cleaning blade 27a, the charging roller 21, and the transferring belt 26 or the like each respectively contact the PC drum as illustrated in FIG. 4, the PC drum 1 greatly tends to vibrate, for example.

However, if a fitting condition of the spring pin 8 in the oblong hole 160 is relatively tight, at the rear side end of the oblong hole 160 like this example, the vibration of the PC drum 1 may efficiently be suppressed and the imperfection rarely appears.

Further, in the background art, referring to FIGS. 8A, 8B, and 8C, when the spring pin 8 is to be inserted with pressure into the penetrating hole 9, a diameter D2 is adjusted to the shorter diameter portion W1 of the oblong hole 16, and the insertion is executed.

According to this manner of insertion, impediments that may be generated at the time of the pressure insertion can be minimized because the split portion 8a is engaged with the inner circumferential surface of the oblong hole 16 as illustrated in FIG. 8A. However, in such a assembling manner, the edge portion constituting the opening of the split portion 8a is generally made sharp, the edge portion may be caught by the inner circumferential surface and receive relatively a large sliding impediment while contacting and sliding the inner circumferential surface.

If a jig for chucking the spring pin 8 and shortening its diameter is utilized in such a case, a direction of the opening of the split portion 8a can be optionally changed and then the spring pin 8 can be inserted. Thus, such a jig may be utilized to arrange the split portion 8a so as to direct in parallel to the longitudinal direction of the oblong hole 160 as illustrated in FIG. 1A for the sake of smoothing the movement of the driving force transferring member 10 along the spring pin 8. The spring pin 8 may be then pressure inserted. Asmooth circumferential surface of the spring pin 8, which is a portion angularly displaced by 90° from the split portion 8a, may contact the oblong hole 160. As a result, smoothness of the moving operation of the driving force transferring member 10 can be maintained, and the movement of the oblong hole 160 along the spring pin 8 may be more readily performed. In addition, a contacting condition of the driving side joint 12 and the driving force receiving side joint 11 can be obtained.

Further, a normal spring pin, i.e., a non-split spring pin can be utilized. However, since elasticity of the split portion generally functions of absorbing looseness to be produced between the spring pin 8 and the oblong hole 160, and usage of a standardized spring pin is favorable in view of the cost performance, the spring pin having the split portion may be preferable.

Further, two or more oblong holes can be provided in the driving force transferring member 10 depending on needs.

In addition, the spring pin can be positioned on the driving force transferring member 10, and the oblong hole fitting with the spring pin can be positioned on the driving shaft 7.

Further, rather than employing the above described PC drum 1, use an image carrier carrying a latent image formed by using magnetic function or the like, which rotates by receiving a motive power from the driving shaft. The image carrier is detachable from the apparatus body for the sake of maintenance or the like, and can be utilized as another example of the rotation member.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A rotating apparatus comprising:
    a motor disposed in a body;
    a rotation member rotatable for rotating by transferring a driving force generated by said motor, said rotation member being detachable from the body;
    a driving shaft for transferring the driving force by rotation in a prescribed direction, said driving shaft being disposed in the body;
    a driving force receiving device for receiving the driving force, said driving force receiving device being disposed in the rotation member and having a driving force receiving joint;
    a driving force transferring device for transferring said driving force from said driving shaft to the rotation member, said driving force transferring device being engaged with said driving shaft and including a driving force transferring joint for engaging with said driving force receiving joint;
    a moving member for moving said driving force transferring device back and forth along said driving shaft so as to respectively engage and disengage said driving force transmitting joint with said driving force receiving joint when the driving force receiving device contacts the driving force transferring device;
    a guiding member provided on at least one of said driving shaft and said driving force transferring device; and
    a cam shaft positioned in said guiding member, said cam shaft being provided on at least one of said driving shaft and said driving force transferring device,
    wherein said cam shaft is positionable in proximity with one end of said guiding member when said driving force receiving joint engages with said driving force transferring joint, and being positionable in proximity with a second end of said guiding member when said driving force transferring joint is separated from said driving force receiving joint and positioned at an initial position, and, wherein said cam shaft is tightly fitted when at said first end of said guiding member, and is loosely fitted when located at said second end of said guiding member.

2. A rotating apparatus according to claim 1, wherein said driving shaft is in an idling mode when said driving force transferring device contacts said driving force receiving device.

3. A rotating apparatus according to claim 2, wherein said driving force transferring device comprises a cylindrical shaped device which slidingly contacts the driving shaft, said driving force transferring device includes said driving force transferring joint on one end thereof.

4. A rotating apparatus according to claim 3, wherein said driving force transferring joint includes a plurality of convex portions and a plurality of concave portions disposed between respective ends of the plurality of neighboring convex portions.

5. A rotating apparatus according to claim 4, wherein said driving force receiving joint includes said plurality of convex portions and said plurality of concave portions each disposed respectively between said plurality of neighboring convex portions, said plurality of concave portions and said plurality of convex portions each respectively engage with said plurality of concave portions and said plurality of convex portions of said driving force transferring joint.

6. A rotating apparatus according to claim 1, wherein said guiding member includes an oblong hole having a pair of curved portions at both ends, wherein a radius of one end of said curved portions is smaller than the other end of said curved portions.

7. A rotating apparatus according to claim 6, wherein said radius of one end of said curved portions is substantially the same as that of said camshaft.

8. A rotating apparatus according to claim 6, wherein said camshaft comprises a spring pin having a split portion.

9. A rotating apparatus according to claim 8, wherein said spring pin is positioned in said oblong hole with said split portion being directed toward a longitudinal direction of said oblong hole.

10. A rotating apparatus according to claim 1, wherein said guiding member comprises a punched out plate-like member made of sintering material.

11. A rotating apparatus according to claim 1, wherein said moving member includes a spring which is connected to said driving force transferring device at one end and is connected to said driving shaft at its other end, said spring applying a biasing force to said driving force transferring joint as is biased toward said driving force receiving joint.

12. An image forming apparatus, comprising:
a rotating apparatus, wherein the rotating apparatus includes:
a motor disposed in a body;
a rotation member rotatable for rotating by transferring a driving force generated by said motor disposed in said body, said rotation member being detachable from said body;
a driving shaft transferring said driving force by rotation in a prescribed direction, said driving shaft being disposed in said body;
a driving force receiving device for receiving the driving force, said driving force receiving device being disposed in the rotation member and having a driving force receiving joint;
a driving force transferring device for transferring said driving force from said driving shaft to the rotation member, said driving force transferring device being engaged with said driving shaft and including a driving force transferring joint for engaging with said driving force receiving joint;
a moving member for moving said driving force transferring device back and forth along said driving shaft so as to respectively engage and disengage the driving force transmitting joint with the driving force receiving joint when said driving force receiving device contacts said driving force transferring device;
a guiding member provided with at least one of said driving shaft and said driving force transferring device; and
a cam shaft positioned in said guiding member, said cam shaft being provided on at least one of said driving shaft and said driving force transferring device,
wherein said cam shaft is positionable in proximity with a first end of said guiding member when said driving force receiving joint engages with said driving force transferring joint, and said cam shaft is positionable in proximity with a second end of said guiding member when said driving force transferring joint is separated from said driving force receiving joint and positioned at its initial position, and, wherein said cam shaft is tightly fitted to said second guiding member at said first end thereof, and is loosely fitted when located at said second end thereof.

13. An image forming apparatus according to claim 12, wherein said driving shaft is in an idling mode when said driving force transferring device contacts said driving force receiving device.

14. An image forming apparatus according to claim 13, wherein said driving force transferring device comprises a cylindrically shaped device and slidingly contacts the driving shaft, said driving force transferring device including said driving force transferring joint on one end thereof.

15. An image forming apparatus according to claim 14, wherein said driving force transferring joint includes a plurality of convex portions and a plurality of concave portions disposed between respective ends of the plurality of neighboring convex portions.

16. An image forming apparatus according to claim 15, wherein said driving force receiving joint includes said plurality of convex portions and said plurality of concave portions each respectively disposed between each respective end of said plurality of neighboring convex portions, said plurality of concave portions and said plurality of convex portions respectively mesh with said plurality of concave portions and said plurality of convex portions of the driving force transferring joint.

17. An image forming apparatus according to claim 12, wherein said guiding member includes an oblong hole having a pair of curved portions at opposite ends thereof, a radius of one end of said curved portions being smaller than the other end of said curved portions.

18. An image forming apparatus according to claim 17, wherein said radius one said end of said curved portions is substantially the same with that of said camshaft.

19. An image forming apparatus according to claim 17, wherein said camshaft includes a spring pin having a split portion.

20. An image forming apparatus according to claim 19, wherein said spring pin is insertable in said oblong hole with said split portion being directed toward a longitudinal direction of the oblong hole.

21. An image forming apparatus according to claim 12, wherein said guiding member comprises a punched out plate like member made of sintering material.

22. An image forming apparatus according to claim 12, wherein said moving member includes a spring which is connected to said driving force transferring device at one end and is connected to said driving shaft at its another end, said spring being configured to apply a biasing force to said driving force transferring joint as is biased toward said driving force receiving joint.

* * * * *